United States Patent [19]

Lukatsch

[11] Patent Number: 4,913,685
[45] Date of Patent: Apr. 3, 1990

[54] WHEEL WITH VARIABLE DIAMETER

[76] Inventor: Johann Lukatsch, Schnepfenweg 1, A-9065 Ebental (Karnten), Austria

[21] Appl. No.: 322,556
[22] Filed: Mar. 13, 1989
[30] Foreign Application Priority Data Mar. 14, 1988 [AT] Austria .................................. 689/88

[51] Int. Cl.$^4$ ............................................. F16H 55/52
[52] U.S. Cl. ..................................................... 474/49
[58] Field of Search .............................. 474/47, 49–57

[56] References Cited

U.S. PATENT DOCUMENTS 999,530  8/1911  Staff et al. ......................... 474/49 X
4,453,923  6/1984  Cole, Jr. ............................. 474/49 X

FOREIGN PATENT DOCUMENTS 493825  3/1930  Fed. Rep. of Germany.
3137018  4/1983  Fed. Rep. of Germany.

Primary Examiner—Thuy M. Bui
Attorney, Agent, or Firm—Young & Thompson

[57] ABSTRACT

A wheel (1) with variable diameter comprises two mutually opposed disks (2, 3) that can be displaced with respect to each other in the direction of their axis of rotation (6), wherein plates (9) are guided in a substantially radially displaceable fashion. The plates (9) taper in the peripheral direction as measured from one disk (2 or 3) toward the other disk (3 or 2) and are coupled displaceably with each other along their lateral surfaces (20). At least one sliding member (15) is arranged on each plate (9) and is displaceable along a sliding path (19), on the one hand, in the direction of the axis of rotation (6) of the wheel (1) and, on the other hand, in the peripheral direction against the force of springs (18), this sliding member (15) carrying at least one entrainment member (16) for engagement into a load transmission member (22).

15 Claims, 6 Drawing Sheets

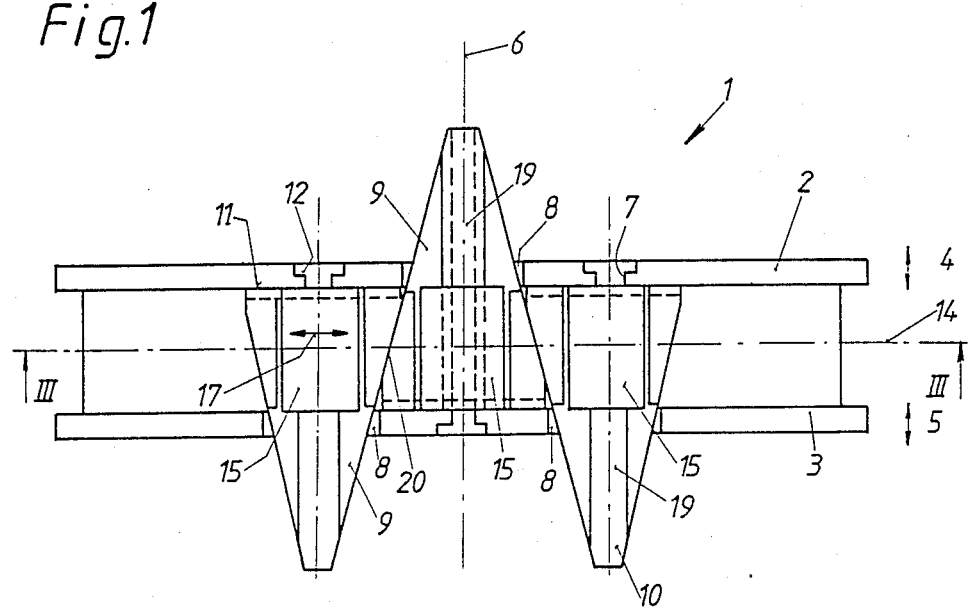
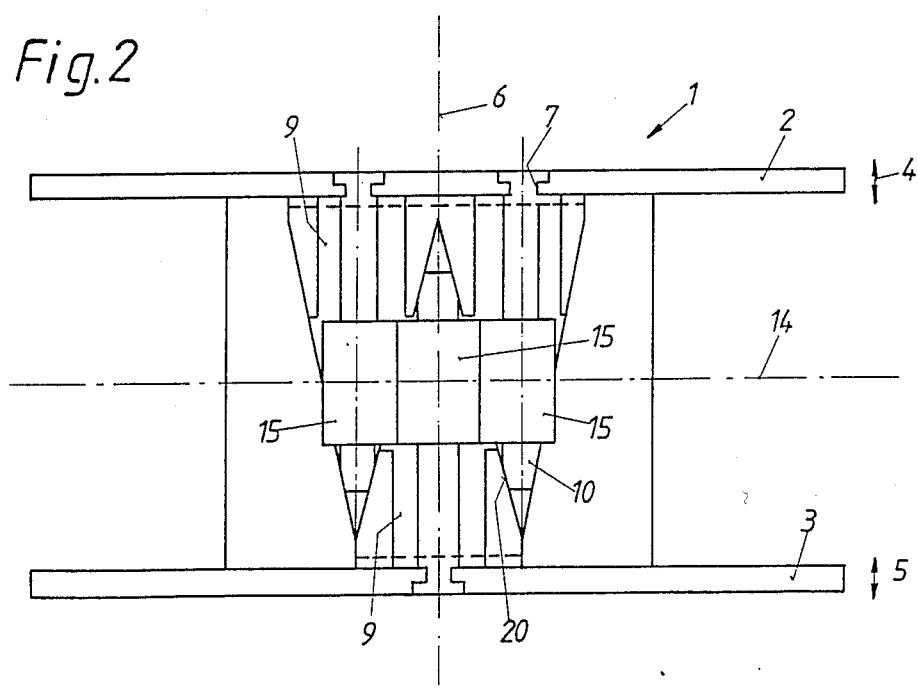

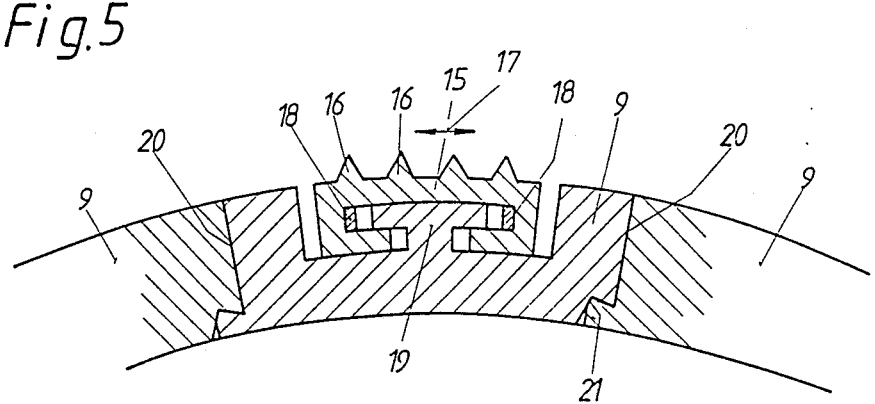
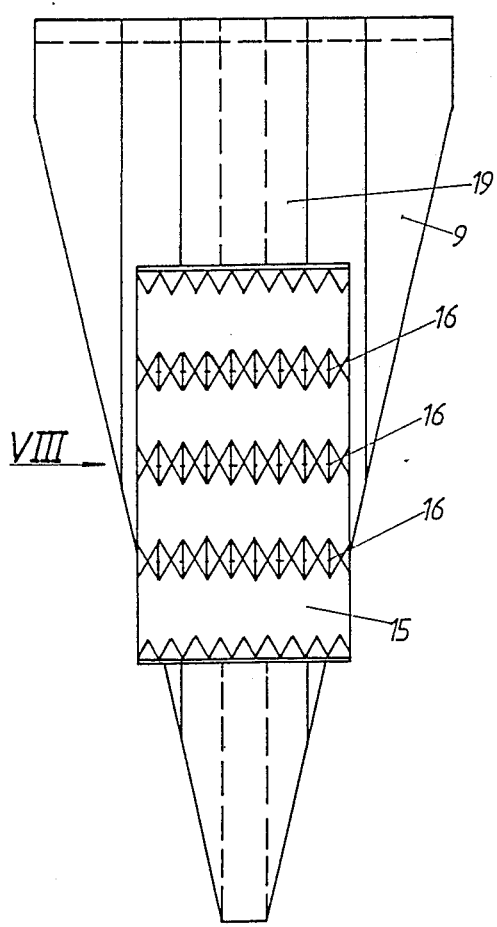
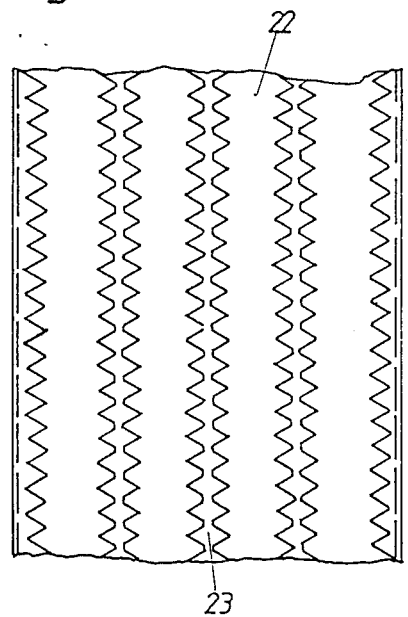
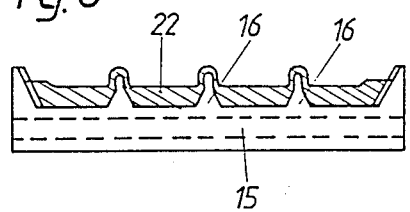

Fig.9
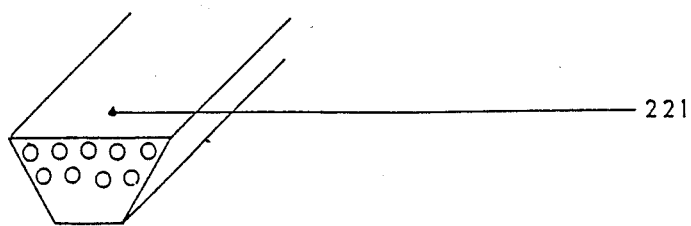
221
Fig.10
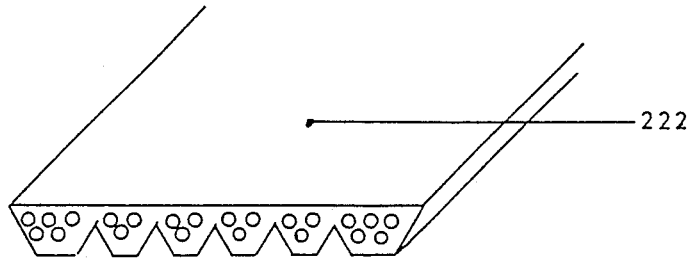
222
Fig.11
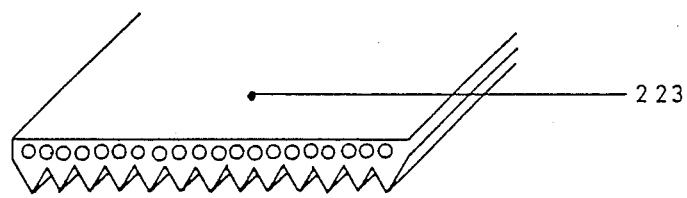
223
Fig.12
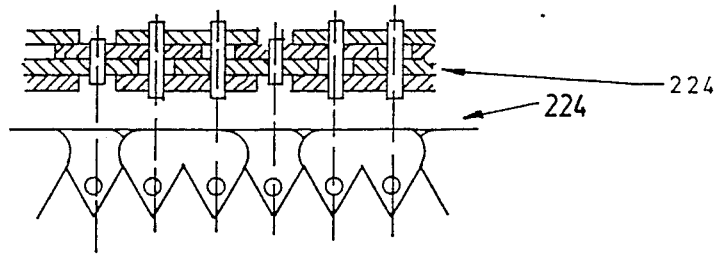
224
Fig.13
224
Fig.14
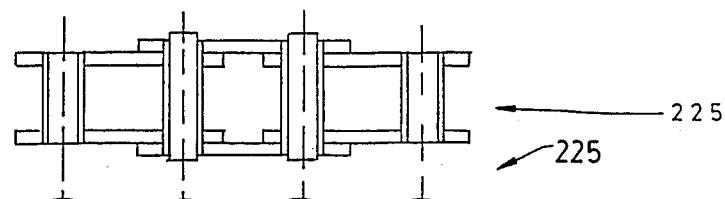
225
Fig.15
225

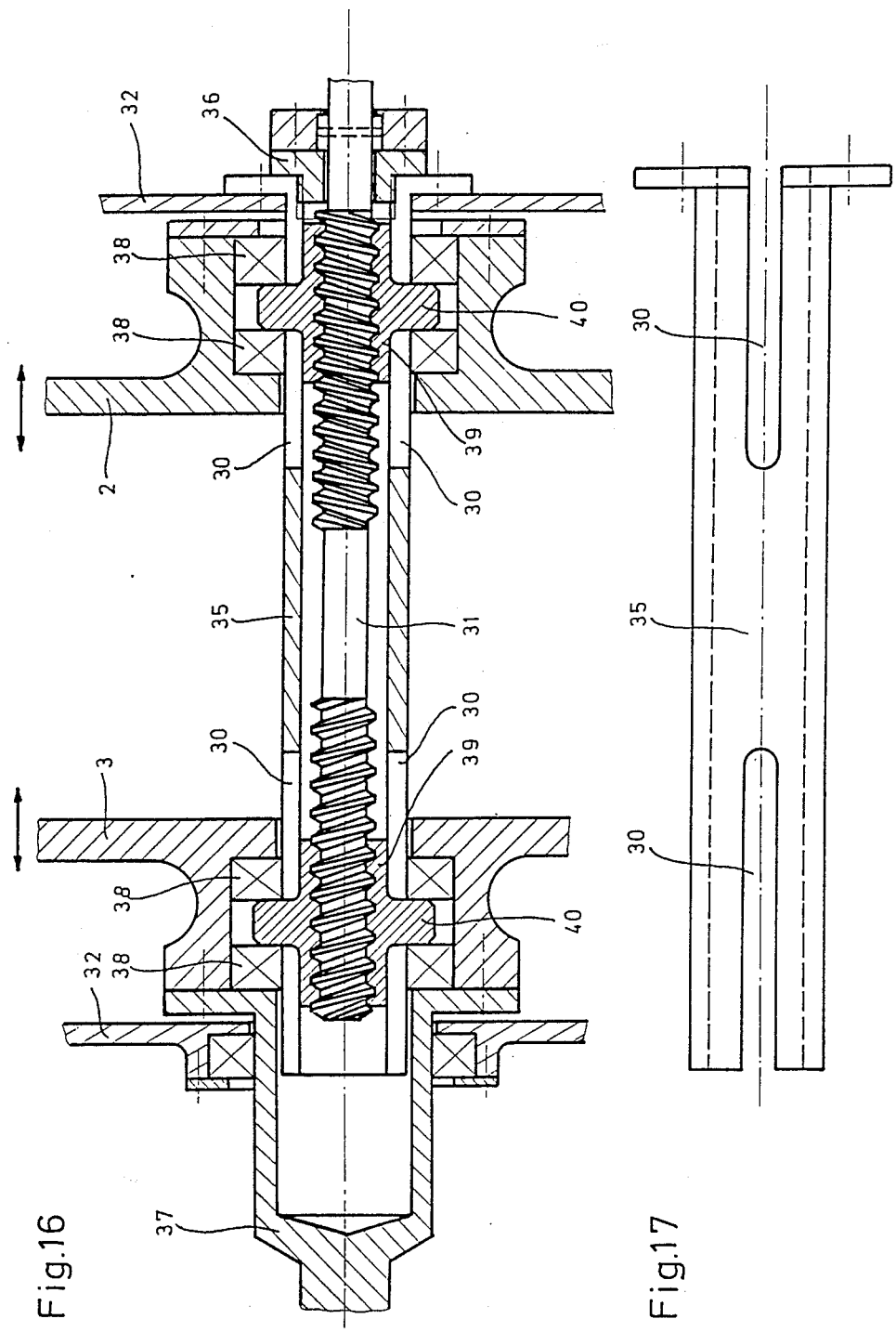

WHEEL WITH VARIABLE DIAMETER

BACKGROUND OF THE INVENTION

The invention relates to a wheel with a variable diameter comprising plates guided in two mutually opposed disks and displaceable from the inside toward the outside and, respectively, from the outside toward the inside.

DE-A1-31 37 018 discloses a wheel having an adjustable diameter. In this wheel, segments are arranged between two disks having a fixed mutual spacing; these segments can be displaced by way of a gear mechanism in radial slots in the disks. The segments are in contact with each other only in their innermost position so that, in any position with a larger diameter, gaps are formed in the outer surface periphery having a deleterious effect during operation of the wheel.

Additionally, a gear mechanism is required for the radial shifting of the segments.

In the wheel disclosed in US-A-999,530, triangular plates are moved radially and with respect to one another by means of spokes supported on the inside of the triangular plates and guided in a hub on the shaft, and by means of arms likewise connected to the plates with one of their ends and to an adjustable nut with their other ends. It is readily apparent that this arrangement is unable to transmit any relatively high torques.

The pulley drive transmission described in DE-C-493,825 with conical disk components has the drawback of high axial forces.

The invention is based on the object of providing a wheel having a variable diameter which can be utilized for the power-derived or shape-mating power transmission from a load transmitting means, such as belts, chains, or the like, to the periphery of the wheel, or vice versa.

According to the invention, this object has been attained by providing that the two mutually opposed disks can be shifted with respect to each other in the direction of their axis of rotation, that the plates taper from one disk to the other as measured in the peripheral direction, and that the plates, disposed side-by-side, are coupled together in a displaceable fashion.

As compared with conventional wheels with conical disks, cooperating with load transmitting means which urge the disks apart during operation, considerably smaller axial friction or compressive forces occur in the wheel according to this invention.

In order to obtain a maximally large range of variation for the diameter of the wheel, the disks exhibit cutouts for the plates guided in the respectively opposite disk.

In one embodiment of this invention, the plates are coupled along their lateral faces by groove and tongue joints wherein respectively one round, undercut strip on one plate is received in a groove of annular shape in cross section provided in the other plate, or the provision is made that the connection of the plates along their lateral faces is constituted by a guide means wherein an obliquely outwardly projecting extension of one plate engages into a corresponding channel in the other plate in order to achieve maximally high stability of the wheel. These connections can be arranged in the zone of the lateral faces of the plates. However, it is also possible to locate these connections radially within or radially outside of the plates. It is likewise possible to additionally provide springs which stress the plates from the outside toward the inside.

The plates are preferably guided in radial slots of the disks; these slots can also be inclined at an angle with respect to the radial orientation whereby a more advantageous force distribution can result in the wheel. Curved slots are also feasible.

The provision can be made within the scope of this invention that the plates are guided by way of sliding surfaces on a lateral face of the disks and by way of a guide extension in the slots. Thereby, the plates are guided by still additional, enlarged sliding surfaces whereby a higher stability of the guidance of the plates is attained.

If the force transmission between the wheel and the load transmission means is to take place in a shape-mating fashion, then the provision can be made according to this invention that at least respectively one sliding member is arranged on the plates which is displaceable along a sliding path approximately in the direction of the axis of rotation of the wheel, and that this sliding member is displaceable in the peripheral direction against the force of springs or inserts of an elastic material, this sliding member carrying at least one dog. On account of the sliding members provided on the plates which carry entrainment means corresponding to the load transmission means, the latter can always remain in the center of the wheel, even if its diameter and width are changed. This is accomplished by guide means which are preferably in parallel to the axis of rotation of the wheel; these guide means can also be inclined with respect to the axis of rotation in order to ensure centering of the load transmission means and of the sliding members in the region of the peripheral center line of the wheel.

Since the interspace between the individual sliding members and their dogs does not always correspond to the pitch of the load transmission means when the wheel diameter changes, the sliding members are also displaceable on the plates in the peripheral direction against the force of springs, for example corrugated flat coil springs or strips of rubber or a similarly elastic material, whereby adaptation to the pitch is obtained, on the one hand, and improved distribution of the force transmission takes place, on the other hand, from the load transmission means to all sliding members in engagement therewith and furthermore via the springs to the plates.

By combining two wheels according to this invention and a load transmission means, an infinitely variable transmission is obtained.

Additional details and features of the invention can be seen from the dependent claims and the description of the embodiment illustrated in the drawings wherein:

FIG. 1 shows a wheel in the position with the maximally large diameter of the wheel, FIG. 2 shows the minimum operating diameter of the wheel, FIG. 3 is a section along line III—III in FIG. 1, FIG. 4 shows an enlarged sectional view of the plates shown in FIG. 3, FIG. 5 shows another embodiment of the guide means between plates, FIG. 6 shows a plate with a sliding member, seen from the outside, FIG. 7 shows an internal view of a serrated steel or plastic belt, FIG. 8 shows a view of the sliding member in direction VIII in FIG. 6 with the serrated steel or plastic belt of FIG. 7, FIGS. 9–15 other possible embodiments of load transmission means, FIG. 16 shows, in a sectional view, an arrangement for the axial displacement of the disks of the wheel, FIG. 17 shows part of the arrangement of FIG. 16, and FIG. 18 is a schematic view of a two-speed transmission with wheels according to this invention.

DESCRIPTION OF THE PREFERRED EMBODIMENTS

Figure 3:
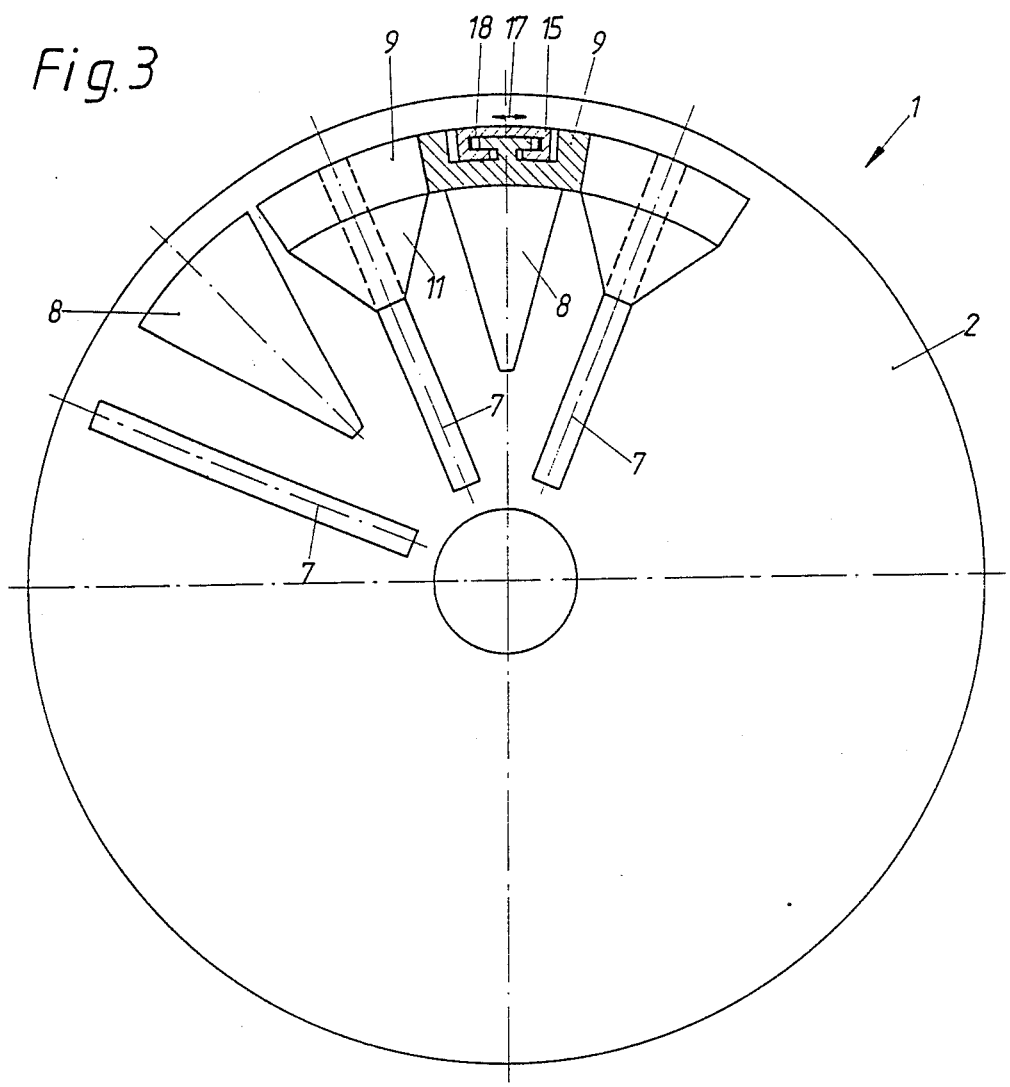

The drawings do not show in every instance all of the plates 9 of a wheel 1.

The wheel 1 consists of two disks 2 and 3 arranged to be mutually displaceable along double arrows 4 and 5, i.e. in the direction of the axis of rotation 6 of the wheel 1, and containing slots 7 extending from the inside toward the outside for guiding the tapering plates 9. These slots 7 are preferably extended radially toward the outside. However, they can also be inclined at an angle to the radial direction and/or curved. Furthermore, the disks 2 and 3 additionally include cutouts 8 through which extends the end 10 of the plates 9 guided in the respectively opposite disk 3 or 2 while the disks 2 and 3 are moved toward each other (compare FIG. 1). The plates 9 are guided by way of guide extensions 12 of a T-shaped configuration in the corresponding slots 7 and, by means of sliding surfaces 11, on the inner faces of the disks 2 and 3, respectively. It is understood that the guide means (slots 7 and guide extensions 12) can also be of a different design. The important point is merely a shape-mating guidance of the plates 9 on the disks 2 and 3.

Figure 4:
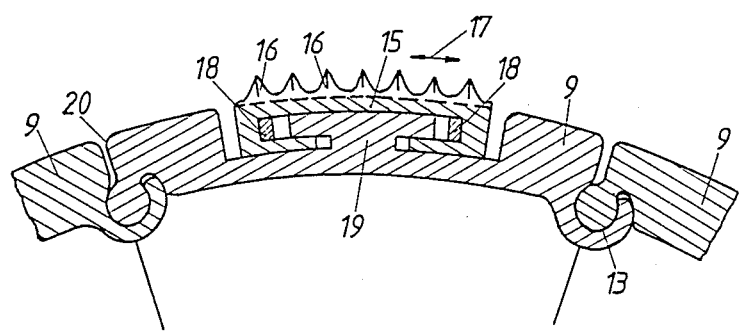

The plates 9 are additionally connected with one another by groove and tongue joints 13 (FIG. 4) in the zone of their lateral surfaces 20 sliding along each other during the mutual shifting of the disk wheels 2 and 3. However, other forms of guidance are likewise possible, as illustrated, for example, in FIG. 5 by the guide means 21.

A possible embodiment also includes the additional arrangement of springs which stress the plates 9 toward the inside. Thereby, a greater operating smoothness and stability of the wheel is obtained.

If, for example, the two wheels 2 and 3 are urged apart, then the plates 9 also slide apart in their groove and tongue joints 13. Thereby, the width of the individual plates 9 is reduced, measured on the peripheral center line 14, and the plates 9 slide inwardly in their slots 7, whereby the operating circumference of the wheel 1 is diminished. Upon urging the disks 2 and 3 toward each other (reduction of the spacing between them), the operating circumference of the wheel 1 is increased.

For the shape-mating connection of the wheel 1 with a load transmission means 22, sliding members 15 are guided on the plates 9 and carry entrainment elements 16 corresponding to the load transmission means 22.

In order to compensate for changes in the pitch at the wheel 1, which arise de to the fact that the distance between the individual sliding members 15 during a change in the diameter of the wheel 1 is not always an integral multiple of the pitch of the load transmission means 22, the sliding members 15 are arranged to be displaceable in the peripheral direction of the wheel 1 along double arrow 17 against the bias of springs 18. Thereby, the sliding members 15 will in all cases adapt to the pitch of the load transmission means 22. The springs 18 also serve as force transmitting means between the sliding members 15 and the plates 9 in order to ensure a maximally uniform distribution of the tractive force of the load transmission means 22 over the partial circumference of the wheel 1 in engagement with the load transmission means 22.

The sliding members 15 are furthermore displaceable approximately in parallel to the direction of the axis of rotation of the wheel 1 along a sliding path 19 that can be designed as a guideway of T configuration hidden in a groove, this guideway being encompassed by the sliding member 15, in order to ensure that the sliding members 15 during the mutual shifting of the disks 2 and 3 will always be located in a line in the region of the peripheral center line 14 of the wheel 1. The guidance of the sliding members at the plates 9 can also be designed to be other than T-shaped. The important aspect resides in a shape-mating guidance action.

The load transmission means 22 shown in FIG. 7 comprises several rows of indentations 23 on its inside facing the plates 9 of the wheel 1. The indentations 23 exhibit a shape corresponding to the entrainment means 16 so that the latter can engage into the indentations 23 as illustrated in FIG. 8.

FIGS. 9 through 15 illustrate other possible embodiments for load transmission means 22, namely: FIG. 9 shows a V belt 221, FIG. 10 shows a composite V belt 222, FIG. 11 shows a ribbed V belt 223, FIGS. 12 and 13 show a sprocket chain 224 in plan view and elevational view, and FIGS. 14 and 15 illustrate a roller or bushing chain 225 in plan and elevational views.

In the arrangement shown in FIG. 16 for the axial displacement of the disks 2 and 3, the disks 2 and 3 are supported to be axially displaceable on a hollow guide axle 35 by way of bearings 38 arranged in pairs. The guide axle 35 is fixedly connected to the housing 32, for example by means of screws. A threaded spindle 31 is arranged in the hollow guide axle 35, this spindle exhibiting two thread zones with opposed pitch. Respectively one adjustable nut 39 is arranged on the thread zones and slides in the hollow guide axle 35. The adjustable nuts 39 each have two extensions 40 passing through slots 30 in the guide axle 35 and engaging respectively between a pair of bearings 38, preferably angular contact ball bearings.

The threaded spindle 31 projects on one side out of the guide axle 35 and out of the housing 32 and is connected to an adjusting member, not shown. By turning the threaded spindle 31, the two disks 2 and 3, depending on the direction of rotation of the threaded spindle 31, are moved toward each other or away from each other via the adjusting nuts 39 and the bearings 38 whereby the diameter of the wheel is altered.

An input or output shaft 37 extends out of the housing 32 on the side of the housing 32 lying in opposition to the threaded spindle 31 projecting from the housing 32, this shaft being fixedly connected to the disk 3 of the wheel 1. The disk 2 of the wheel 1 is connected to the disk 3 and thus to the input or output shaft 37 by way of the plates 9 (not illustrated) and participates freely in the rotation on the guide axle 35.

Figure 18:
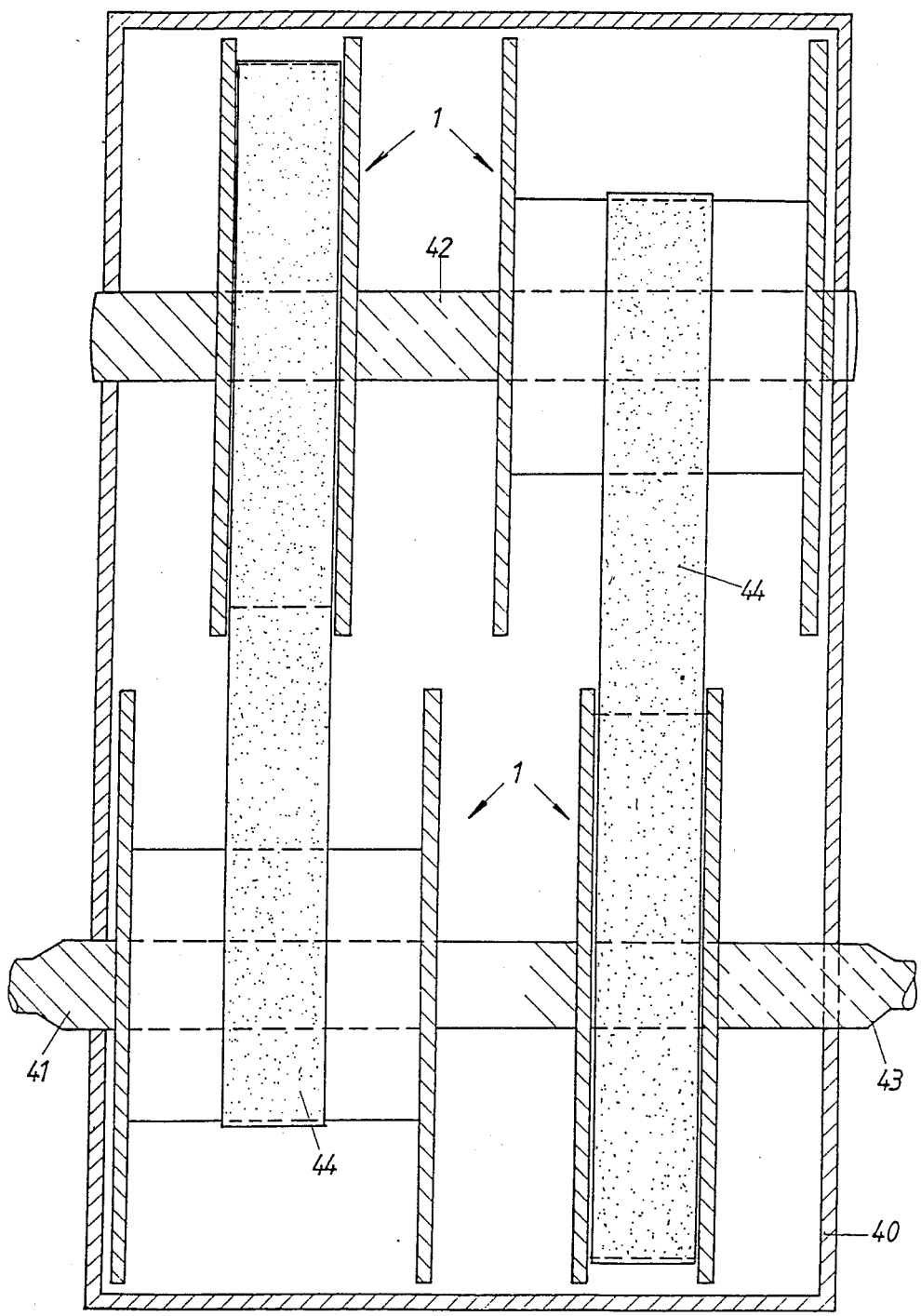

FIG. 18 shows schematically a two-speed transmission in a housing 40 with four wheels 1 according to this invention, two load transmission means 44, a drive shaft 41, an intermediate shaft 42, and an output shaft 43.

What is claimed is:

1. A wheel of variable diameter, comprising a pair of disks and means interconnecting the pair of disks for axial movement relative to one another; a plurality of opposed cooperating plates disposed peripherally about the pair of disks, said plates having cooperating tapered edges; and means mounting said plurality of plates on said pair of disks for axial and radial movement relative to said pair of disks; whereby axial movement of one of said pair of disks towards the other of said pair of disks causes cooperation of said cooperating tapered edges of said plurality of plates to increase the diameter of said wheel, and axial movement of one of said pair of disks away from the other of said pair of disks causes cooperation of said cooperating tapered edges of said plurality of plates to coact to decrease the diameter of said wheel; wherein said cooperating tapered edges of said plurality of plates are connected to one another in a manner permitting said axial and radial movement relative to said pair of disks.

2. The wheel according to claim 1, wherein said means for mounting said plurality of plates on said pair of disks comprises cutout portions formed in the pair of disks, the said cutout portions of one of said pair of disks receiving distal ends of the plurality of plates mounted on the other of said pair of disks.

3. The wheel according to claim 1, wherein said cooperating tapered edges are interconnected by means of tongue and groove joints formed on said cooperating tapered edges.

4. The wheel according to claim 1, wherein said cooperating tapered edges are interconnected by means comprising a notch extending along one of said cooperating tapered edges, and a corresponding projection extending along an adjacent cooperating tapered edge of said plurality of plates.

5. The wheel according to claim 1, wherein said means for mounting said plurality of plates on said pair of disks comprise radially extending slots formed in said pair of disks, for guiding said plurality of plates in radial movement relative to said disks.

6. The wheel according to claim 1, wherein said means for mounting said plurality of plates on said pair of disks comprises a plurality of radially extending guide slots formed in said pair of disks, and guide extensions formed on said plurality of plates and received in said guide slots, said pair of disks and said plurality of plates further comprising abutting guide surfaces extending perpendicularly to said guide slots and guide extensions.

7. The wheel according to claim 1, wherein said guide slots are of a T-shaped cross section, and said guide extensions are of a corresponding T-shaped cross section.

8. A wheel of variable diameter, comprising a pair of disks and means interconnecting the pair of disks for axial movement relative to one another; a plurality of opposed cooperating plates disposed peripherally about the pair of disks, said plates having cooperating tapered edges; and means mounting said plurality of plates on said pair of disks of axial and radial movement relative to said pair of disks; whereby axial movement of one of said pair of disks toward the other of said pair of disks causes cooperation of said cooperating tapered edges of said plurality of plates to increase the diameter of said wheel, and axial movement of one of said pair of disks away from the other of said pair of disks causes cooperation of said cooperating tapered edges of said plurality of plates to coact to decrease the diameter of said wheel; further comprising sliding members disposed on said plurality of plates, said sliding members being displaceable along a sliding path approximately in the direction of the axis of rotation of the wheel, said sliding member also being displaceable peripherally of said wheel against the action of springs or elastic inserts, each of said sliding members comprising at least one entrainment means.

9. The wheel according to claim 8, wherein said sliding path is a T-shaped guide means formed on said plurality of plates and encompassed by the sliding members.

10. A wheel of variable diameter, comprising a pair of disks and means interconnecting the pair of disks for axial movement relative to one another; a plurality of opposed cooperating plates disposed peripherally about the pair of disks, said plates having cooperating tapered edges; and means mounting said plurality of plates on said pair of disks for axial and radial movement relative to said pair of disks; whereby axial movement of one of said pair of disks toward the other of said pair of disks causes cooperation of said cooperating tapered edges of said plurality of plates to increase the diameter of said wheel, and axial movement of one of said pair of disks away from the other of said pair of disks causes cooperation of said cooperating tapered edges of said plurality of plates to coact to decrease the diameter of said wheel; further comprising adjusting nuts for shifting the pair of disks, these nuts being in engagement with a threaded spindle having two thread zones of opposed pitch.

11. The wheel according to claim 10, wherein said threaded spindle is disposed in a guide axle fixedly joined to a housing.

12. The wheel according to claim 11, wherein the pair of disks are supported and axially guided on the guide axle by means of a pair of roller bearings associated with each of the pair of disks.

13. The wheel according to claim 11, further comprising at least one extension provided at the adjusting nuts, said extension projecting through at least one slot formed in the guide axle and engaging between a pair of roller bearings in the disks.

14. The wheel according to claim 11, wherein the threaded spindle extends on one side out of the guide axle.

15. The wheel according to claim 10, wherein an input or output shaft is connected to at least one of the pair of disks.

* * * * *